United States Patent [19]

Kondo

[11] Patent Number: 5,748,624
[45] Date of Patent: May 5, 1998

[54] METHOD OF TIME-SLOT ALLOCATION IN A TDMA COMMUNICATION SYSTEM

[75] Inventor: Takayuki Kondo, Tokyo, Japan

[73] Assignee: NEC Corporation, Tokyo, Japan

[21] Appl. No.: 594,913

[22] Filed: Jan. 31, 1996

[30] Foreign Application Priority Data

Jan. 31, 1995 [JP] Japan .................... 7-013592

[51] Int. Cl.$^6$ ................ H04B 7/212; H04J 3/16
[52] U.S. Cl. ............. 370/347; 370/442; 370/458; 370/468
[58] Field of Search .................. 370/337, 346, 370/347, 348, 442, 443, 445, 449, 450, 458, 459, 462, 465, 468, 477; 379/58, 59, 60; 455/33.1, 33.2, 34.1, 34.2, 53.1, 54.1, 54.2, 56.1

[56] References Cited

U.S. PATENT DOCUMENTS

| | | | |
|---|---|---|---|
| 3,988,545 | 10/1976 | Kuemmerle et al. | 370/537 |
| 4,763,321 | 8/1988 | Calvignac et al. | 370/468 |
| 4,949,395 | 8/1990 | Rydbeck | 456/33.1 |
| 4,980,886 | 12/1990 | Bernstein | 370/468 |
| 5,351,240 | 9/1994 | Highsmith | 370/468 |
| 5,515,379 | 5/1996 | Crisler et al. | 370/347 |
| 5,521,925 | 5/1996 | Merakos et al. | 370/337 |

FOREIGN PATENT DOCUMENTS

| | | |
|---|---|---|
| 0 171 596 | 2/1986 | European Pat. Off. . |
| 0 251 587 | 1/1988 | European Pat. Off. . |
| 0 428 407 | 5/1991 | European Pat. Off. . |
| 2-203632 | 8/1990 | Japan . |

*Primary Examiner*—Alpus H. Hsu
*Attorney, Agent, or Firm*—Foley & Lardner

[57] ABSTRACT

An efficient method of time-slot allocation for a communication in a time division multiple access (TDMA) communication system which allocates one or more time-slots in a TDMA frame is provided. When new call request occurs, availability of idle time-slot for the communication is examined. If there is not enough idle time-slot to be allocated for the new call, it is examined whether there is high transmission speed communication using a plurality of time-slots. When any of the high transmission speed communications exist, time-slots are shared by newly requested communication and the high transmission speed communication using a maximum number of time-slots among the high transmission speed communications. Transmission speed adjustment is performed for such high transmission speed communications sharing a part of time-slot. The probability of occurence of call loss is decreased by this method.

10 Claims, 11 Drawing Sheets

METHOD OF TIME-SLOT ALLOCATION IN A TDMA COMMUNICATION SYSTEM

BACKGROUND OF THE INVENTION

1. Field of the Invention

The present invention relates to a method of time-slot allocation in a time division multiple access (TDMA) communication system which allocates one or more time-slots in a TDMA frame for a communication signal to perform the communication, and, more particularly, to a method of efficient time-slot allocation for high transmission speed data communication.

2. Description of the Related Art

In conventional TDMA communication systems, there has been proposed a method in which a plurality of fixed number of time-slots are allocated to a communication signal having a higher transmission speed than the transmission speed of one time-slot in a TDMA frame.

An example of conventional methods of allocating a plurality of fixed number of time-slots in a TDMA frame is described in Japanese Patent Application Laid-Open No. Hei 2-203632.

Figure 1A:
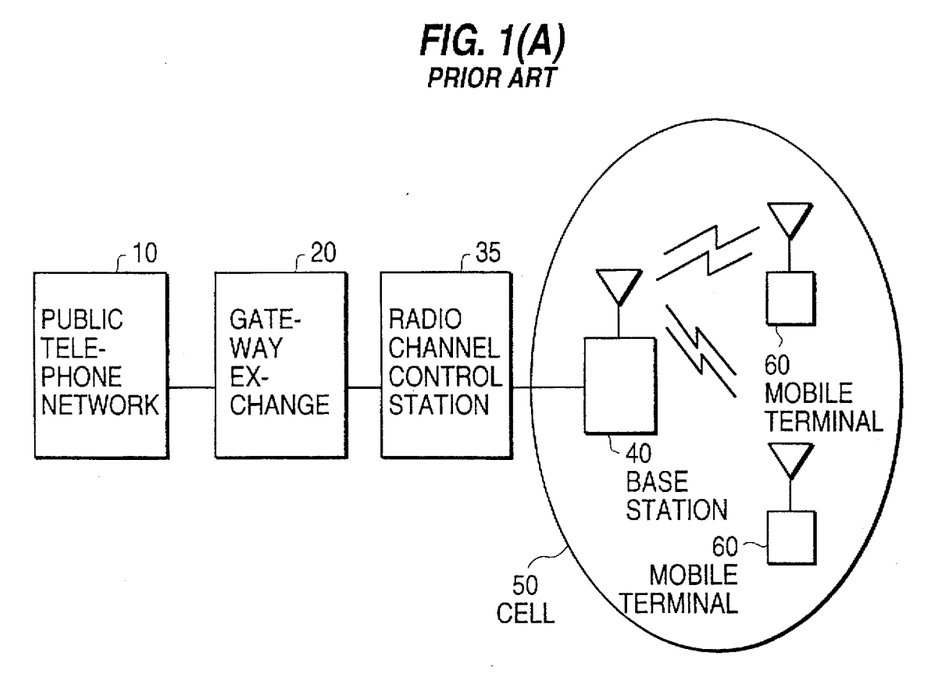
FIG. 1(A) is a schematic block diagram of a mobile communication system using a conventional TDMA communication system.
Figure 1B:
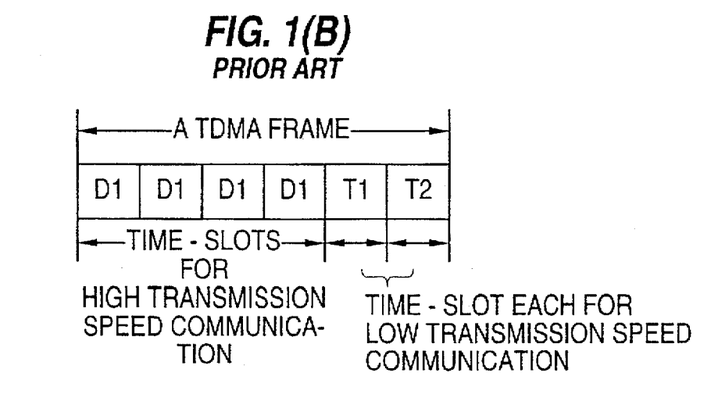
FIG. 1(B) is a diagram showing an example of the conventional TDMA frame construction of a carrier to which a plurality of time-slots are allocated for a high transmission speed communication data and one time-slot is allocated to low transmission speed communication data.

FIGS. 1(A) and 1(B) show a system construction and a TDMA frame, respectively, for explaining this conventional technique.

This system is constituted by a public telephone network 10, a gateway exchange 20 for switching and connecting the public telephone network 10 and a mobile radio communication system which is adopting a TDMA communication system. The mobile radio communication system is constituted by a radio channel control station 35 connected to the gateway exchange 20, a base station 40 connected to the radio channel control station 35 and a plurality of mobile terminals 60 which can communicate, within a cell 50 where the base station 40 covers, with the base station 40 by radio signals.

The radio channel control station 35 has a function of allocating a plurality of fixed number of time-slots to a communication signal having a higher transmission speed than the transmission speed provided for one time-slot in a TDMA frame.

FIG. 1(B) is a diagram showing an example of the TDMA frame construction of the carrier when a plurality of time-slots are allocated to a communication signal having a higher transmission speed than the transmission speed provided for one time-slot in the TDMA frame. In this case, one time-slot is capable of transferring one channel of low transmission speed communication signal indicated by T1 or T2. In this time-slot provision, 4 time-slots are allocated to high transmission speed communication signal indicated by D1.

For an example, if one time-slot is provided for having a capability of transferring 32 kbps signal, communication signal of 64 kbps is allocated to two time-slots, and communication signal of 128 kbps is allocated to four time-slots.

In the aforementioned conventional time-slot allocating method, the TDMA frame is constructed such that one time-slot corresponds to the lowest transmission speed signal, and with respect to a higher transmission speed signal, various kinds of transmission speed signals are dealt with by allocating a plurality of fixed number of time-slots enough for transferring the data. Therefore, if a ratio of the number of higher transmission speed communication is larger than the lowest transmission speed communication in the TDMA communication system, the probability of requiring a plurality of idle time-slots to be allocated at the same time to a new communication request will be increased. As the result, there is the drawback that the probability of call loss is increased because the call request which needs a plurality of time-slots enough for transferring the data is rejected if sufficient idle time-slots are not available at the time of time-slots allocation.

SUMMARY OF THE INVENTION

The objective of the present invention is to provide an efficient TDMA time-slot allocating method which is capable of flexible time-slots allocation for a high transmission speed communication for reducing the call loss of a newly requested call when a ratio of high transmission speed communication is relatively large in the communication system.

A method of time-slot allocation for a communication in a time division multiple access (TDMA) communication system which allocates one or more time-slots in a TDMA frame, comprises the following steps:

(1) detecting a request for new communication;

(2) examining whether number of idle time-slot required for the new communication detected is available;

(3) examining whether any of high transmission speed communication using a plurality of time-slots exist, if the number of idle time-slot required for the new communication is not available;

(4) releasing at least one time-slot from a plurality of time-slots being used for one of the high transmission speed communications existing; and (5) allocating the released time-slot to the new communication requested.

According to the present invention, allocation of time-slots for the high transmission speed communication has a flexibility. Although all time-slots required for transmitting the data in the normal speed is preferable, it can be reduced depending on the availability of idle time-slot for a newly requested call. If there is not enough idle time-slot for the new call, a part of time-slots currently being used for the high transmission speed communication is released and used for the new call to avoid rejection of a call request due to non-availability of idle time-slot.

The method of time-slot allocation as set forth above further comprises the following steps in releasing at least one time-slot from a plurality of time-slots being used for one of the high transmission speed communications existing:

(1) examining the high transmission speed communication using a maximum number of time-slots;

(2) releasing at least one time-slot from a plurality of time-slots being used for the high transmission speed communication examined; and (3) performing transmission speed adjustment depending on the number of time-slots being released.

The high transmission speed communication whose time-slot is partially released is selected from those which are using a maximum number of time-slots, and transmission speed adjustment should be performed because it is no longer being allocated a sufficient number of time-slots to support the current transmission speed.

When releasing time-slot of the high transmission speed communication, the following should also be considered:

(1) releasing at least one time-slot so that a number of time-slots of the high transmission speed communication being examined and a number of time-slots of the new high transmission speed communication become as equal as possible.

There is another aspect of the present invention.

A method of time-slot allocation for a communication in a TDMA communication system comprises the following steps:

(1) detecting any of idle time-slots becoming available due to completion of other communication;

(2) finding a high transmission speed communication using an insufficient number of time-slots; and (3) allocating time-slots becoming available to the high transmission speed communication that is using the insufficient number of time-slots.

This is time-slot reallocation when idle time-slot becomes available. Those time-slots are to be reallocated to a high transmission speed communication having an insufficient number of time-slots.

The method of time-slot allocation as set forth (time-slot reallocation), further comprises the step of:

(1) changing over a high transmission speed communication from a different carrier, when the idle time-slots becoming available are no longer used in the same carrier but demand exists in a different carrier.

It means that idle time-slots becoming available are allowed to be allocated to a high transmission speed communication currently being allocated in the different carrier as far as this allocation contributes to efficient use of the communication system.

DETAILED DESCRIPTION OF THE PREFERRED EMBODIMENT

The present invention will be described in the following by referring to the attached drawings.

Figure 2A:
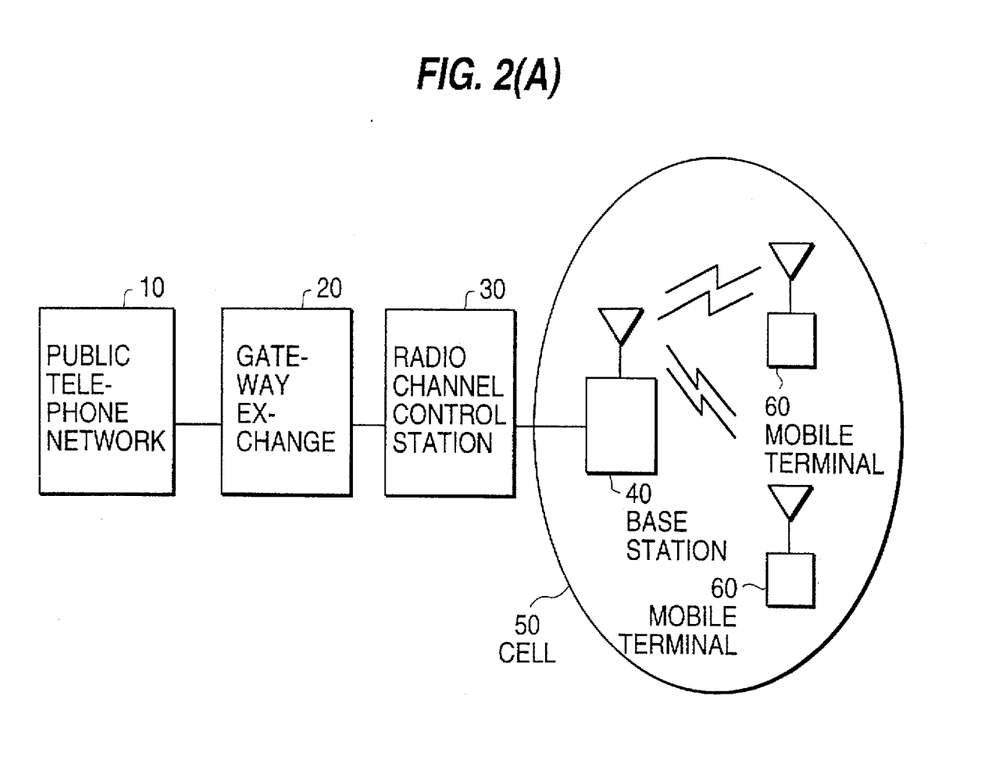
FIG. 2(A) is a schematic block diagram of a mobile communication system using an embodiment of the present invention.

FIG. 2(A) is a schematic block diagram of a TDMA communication system of an embodiment of the present invention. The network construction of the communication system of the embodiment is basically the same as the conventional construction shown in FIG. 1(A).

Calls from/to a public telephone network 10 are switched and connected to/from a mobile radio communication system by a gateway exchange 20. The gateway exchange 20 is connected to a radio channel control station 30. To the radio channel control station 30 there is connected a base station 40. The base station 40 covers a cell 50 which is a radio communication area. Within the cell 50 there exist a plurality of mobile terminals 60, each of which accommodates a telephone set or terminal equipment each subscriber has. The mobile terminals 60 are communicatable with the base station 40 by radio signals. In this drawing, only one base station 40 is shown, however, there may exist a plurality of base stations to be connected to the radio channel control station 30.

Figure 2B:
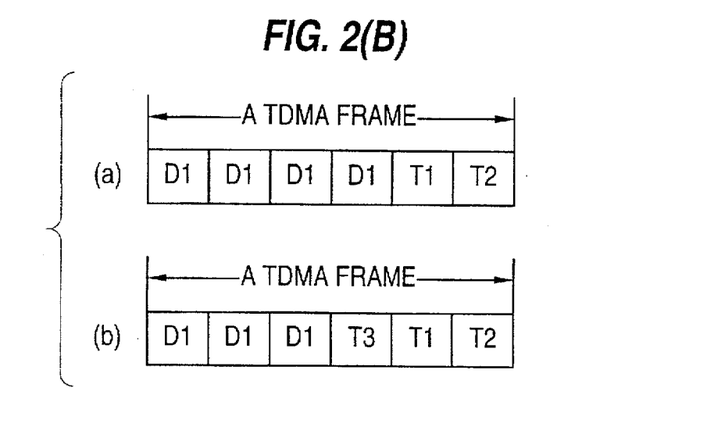
FIG. 2(B) is a diagram showing an example of a TDMA frame construction of a carrier according to the present invention to which a plurality of time-slots are allocated for a high transmission speed communication data depending on the traffic condition.

The radio channel control station 30 controls time-slots allocation of the TDMA frame according to the present invention for calls from/to gateway exchange 20 to/from the base station 40. The specific feature of the present invention is to allow flexible time-slot allocation requiring a plurality of time-slots. For example, the time-slots of the TDMA frame shown in FIG. 2(B), (a) are allocated for one high transmission speed communication data D1 and two low transmission speed communication data T1 and T2, and four time-slots are allocated for data D1. Depending on the traffic condition, the number of time-slots allocated for the high transmission speed communication is varied. The time-slots of the TDMA frame shown in FIG. 2(B), (b) are allocated for one high transmission speed communication data D1 and three low transmission speed communication data T1, T2 and T3, and three time-slots are allocated for data D1 instead of four time-slots.

Figure 3:
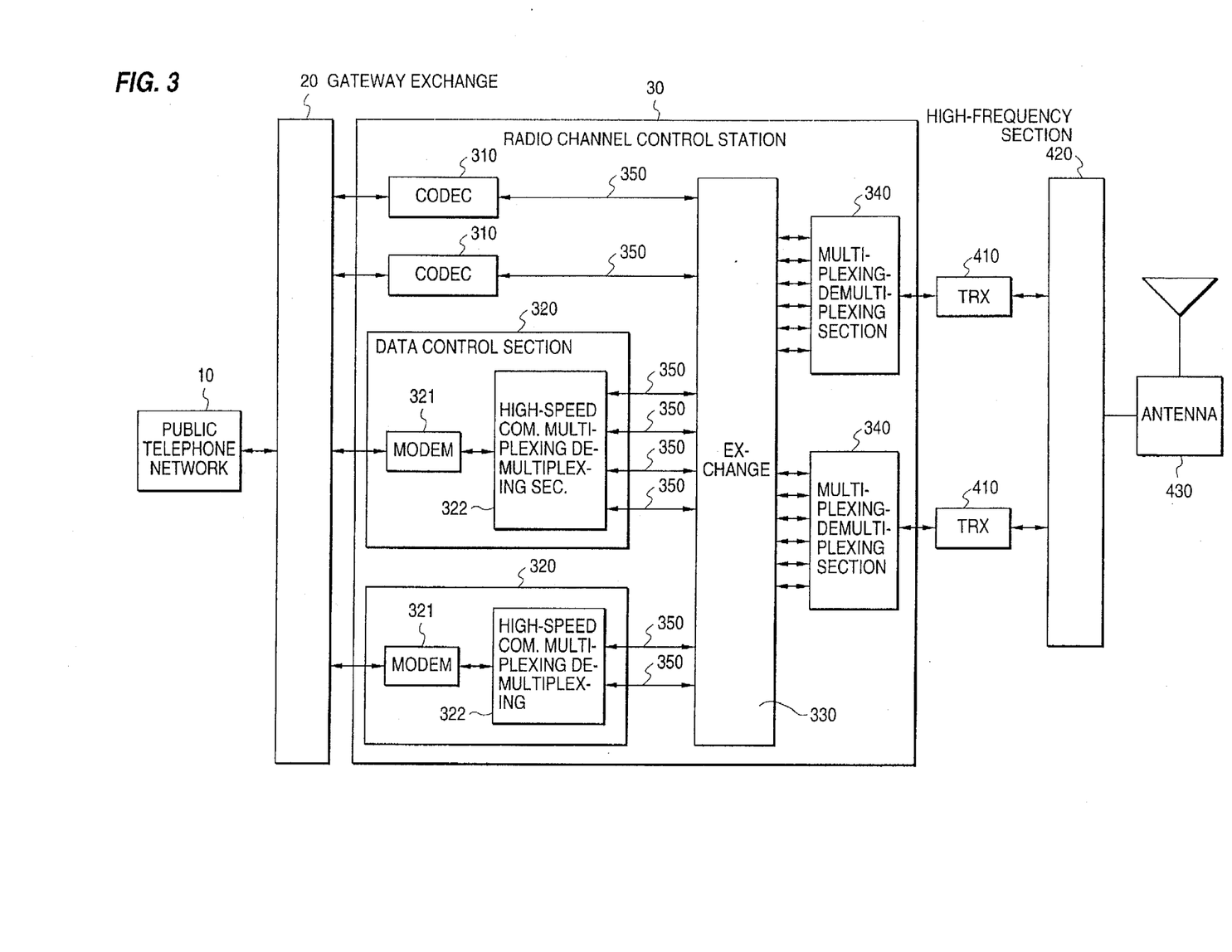
FIG. 3 is a schematic block diagram of the radio channel control station 30 in FIG. 2.

FIG. 3 is a schematic block diagram of the radio channel control station 30 in the FIG. 2. The radio channel control station 30 is constituted by codecs 310, data control sections 320, an exchange (or a switching section) 330, and multiplexing-demultiplexing sections 340. The data control section 320 includes a modem 321 and a high-speed communication multiplexing-demultiplexing section 322. The multiplexing-demultiplexing sections 340 are connected to TRXs (Transmitters/Receivers) 410, and the TRXs 410 are connected through a high frequency section 420 to an antenna 430 for radio signal transmission and reception.

A call path for the low transmission speed communication is established between the CODEC 310 and the public telephone network 10 through the gateway exchange 20, and a call path for the high transmission speed communication is established between the data control section 320 and the public telephone network 10 through the gateway exchange 20.

In the embodiment of the present invention, let a voice call be an example of low transmission speed communication.

In the case of the signal transmission for a call to the mobile terminal 60, a call from the public telephone network 10 is switched and connected to the codec 310 by the gateway exchange 20. The signal of the call processed by the codec 310 is switched and provided to the multiplexing-demultiplexing section 340 by the exchange 330 in the radio channel control station 30. At the multiplexing-demultiplexing section 340, the signal and other signals of other calls are multiplexed and provided to the TRX 410. The multiplexed signals are transmitted through the high-frequency section 420 and from the antenna 430 to the mobile terminal 60.

In the case the signal reception for a call from the mobile terminal 60, the signal of the call received at the antenna 430 is provided through the high-frequency section 420 and the TRX 410 to the multiplexing-demultiplexing section 340. The signals, demultiplexed at the multiplexing-demultiplexing section 340, are switched and provided to the codecs 310 by the exchange 330 in the radio channel control station 30. The signals processed by the codecs 310 are switched and transferred to the public telephone network 10 by the gateway exchange 20.

Next, a description will be made of the case of high transmission speed communication.

In the case of the signal transmission for a call to the mobile terminal 60, a call from the public telephone network 10 is switched and connected to the modem 321 of the data control section 320 by the gateway exchange 20. The signal modulated by the modem 321 is provided to the high-speed communication multiplexing-demultiplexing section 322 and is separated to a plurality of lines 350 that can be allocated depending on the transmission speed of data of the communication. Here, the transmission speed of the lines 350, connected to the exchange 330 in the radio channel control station 30, are equal to one another, and are equal to the data speed of the low transmission speed communication. The separated signals are switched and provided to the multiplexing-demultiplexing sections 340 by the exchange 330 in the radio channel control station 30. At multiplexing-demultiplexing sections 340, the separated signals and other signals are multiplexed and provided to the TRXs 410. The multiplexed signals are transmitted through the high-frequency section 420 and from the antenna 430 to the mobile terminal 60.

In the case of the signal reception for a call from the mobile terminal 60, the signal received at the antenna 430 is provided through the high-frequency section 420 and the TRX 410 to the multiplexing-demultiplexing section 340. The signals, demultiplexed at the multiplexing-demultiplexing section 340, are switched and provided through the lines 350 to the high-speed communication multiplexing-demultiplexing sections 322 in the data control section 320 by the exchange 330 in the radio channel control station 30. At the high-speed communication multiplexing-demultiplexing section 322, the signals are demultiplexed and restored to a single signal and provided to the modem 321. The signal modulated by the modem 321 is switched and transferred to the public telephone network 10 by the gateway exchange 20.

As described above, each multiplexing-demultiplexing section 340 in the mobile channel control station 30 corresponds to the TDMA frame for each carrier, and allocation of time-slot for the TDMA frame is performed by connection switching between each line 350 corresponding to the CODEC 310 or the data control section 320 and each input of the multiplexing-demultiplexing section 340 controlled by the exchange 330. The high transmission speed communication data provided in the data control section 320 is distributed to required number of low transmission speed data which corresponds to the line 350 and also corresponding to the time-slot of the TDMA frame.

Next, a description will be made of an example of the operation of the mobile terminal 60 in the case where a plurality of time-slots are allocated to a high transmission speed communication data.

Figure 4:
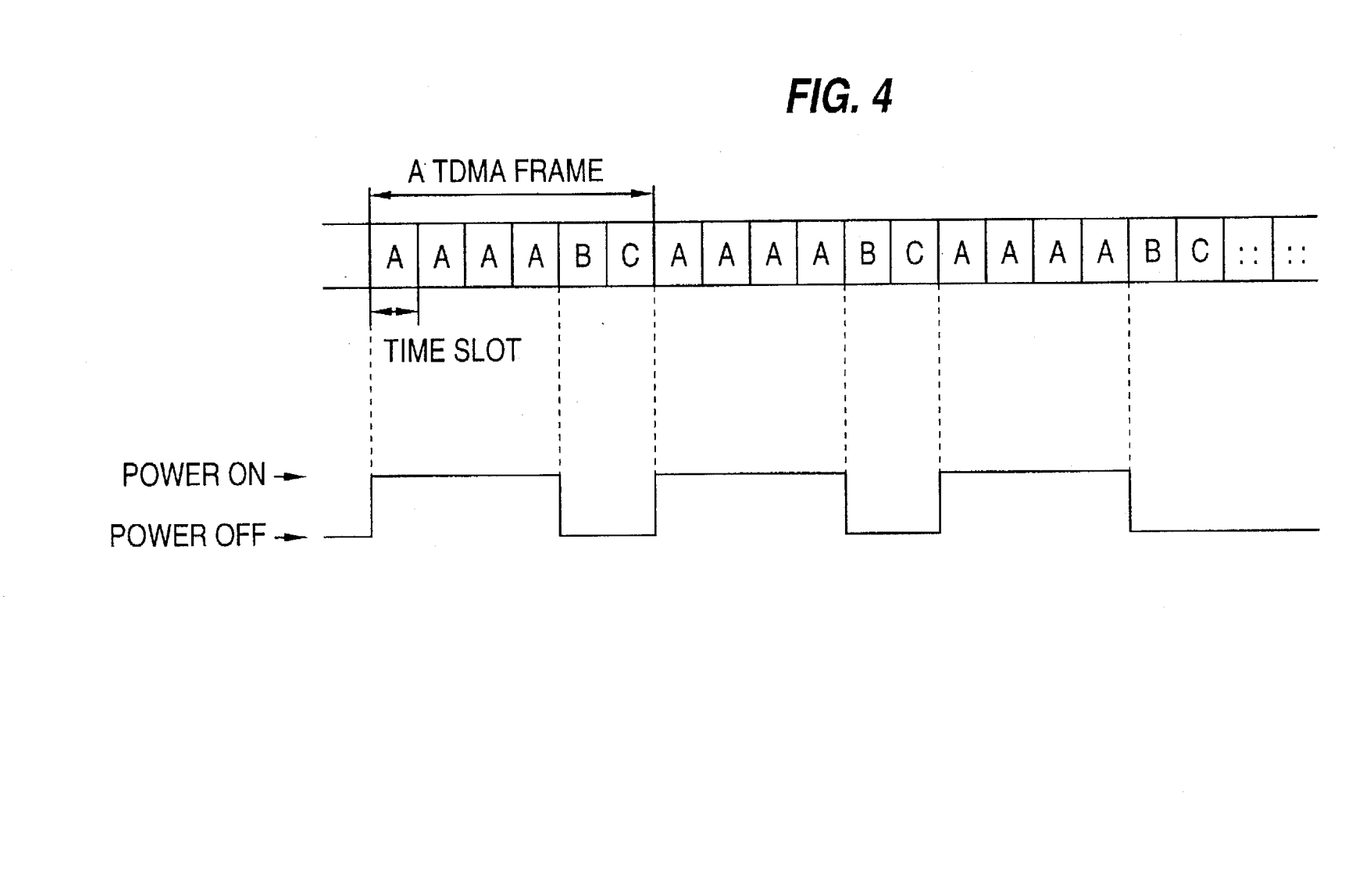
FIG. 4 is a diagram showing an example of the operation of the mobile terminal 60 in FIG. 2 in the case where a plurality of time-slots are allocated to its communication.

For the mobile terminal 60, a carrier frequency and the time-slot number to be used for the communication are specified prior to the commencement of the communication or during the communication by the radio channel control station 30. As shown in FIG. 4, the mobile terminal 60, which performs high-speed communication using a plurality of time slots, transmits and receives a signal when the transmitter-receiver of the mobile terminal is powered on, and whose operation has been instructed by the radio channel control station 30 depending on the allocation of time-slots of the TDMA frame to be used for the communication.

The radio channel control station 30 monitors the status of use of the time-slots, and performs the appropriate time-slot allocation at the time when a new call is requested or any of idle time-slot has become available due to completion of another calls.

Note that in this embodiment, the TDMA frame construction of the upward direction and the TDMA frame construction of the downward direction are assumed to be the same.

When the radio channel control station 30 has received a request for a high transmission speed communication from the mobile terminal 60, the radio channel control station 30 will search for a carrier capable of allocating the maximum number of idle time-slots for the communication to one TDMA frame and notify the mobile terminal 60 of a usable carrier and a usable time-slot number. The mobile terminal 60 sends the confirmation of the notification to the radio channel control station 30, and commencing the communication by using the notified carrier and time-slots.

When it arises a necessity of changing the carrier and/or the allocation of time-slots during the communication, a message which instructs temporarily to interrupt the communication is sent from the radio channel control station 30 to the mobile terminal 60 for notifying the necessity of changing the carrier and the time-slot to be used for the communication. The mobile terminal 60, upon reception of this message, will temporarily stop the transmission of data for the communication and send back the confirmation message to the radio channel control station 30. The radio channel control station 30, upon reception of this confirmation, will notify the mobile terminal 60 of a new carrier and a new time-slot number to be used. The mobile terminal 60 sends back the confirmation of the notification and changes the carrier to the new frequency and the synchronized operation with new time-slots, and continues the communication.

Figure 5:
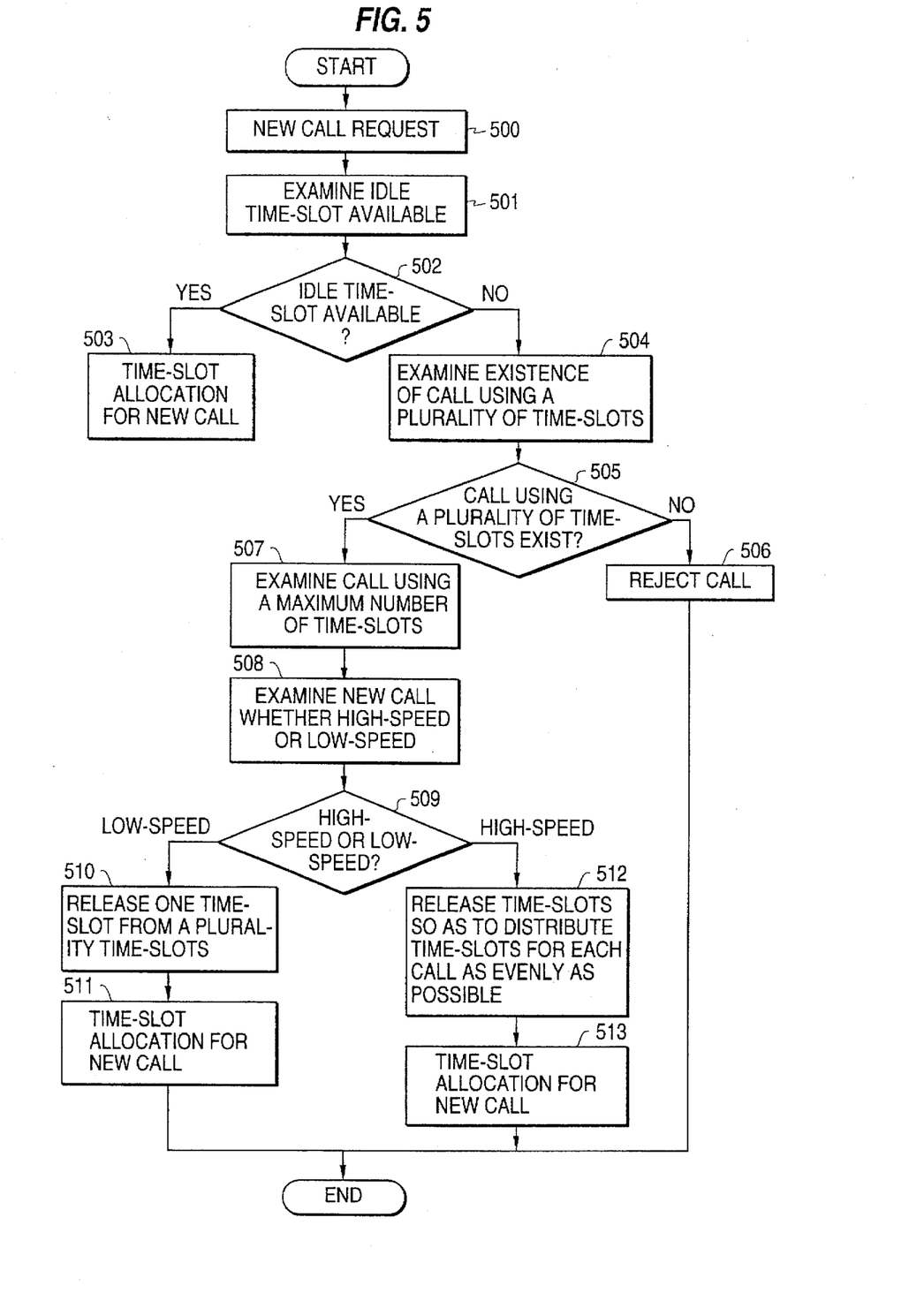
FIG. 5 is a flowchart of the time-slot allocation according to the present invention when a call request is received.
Figure 7:
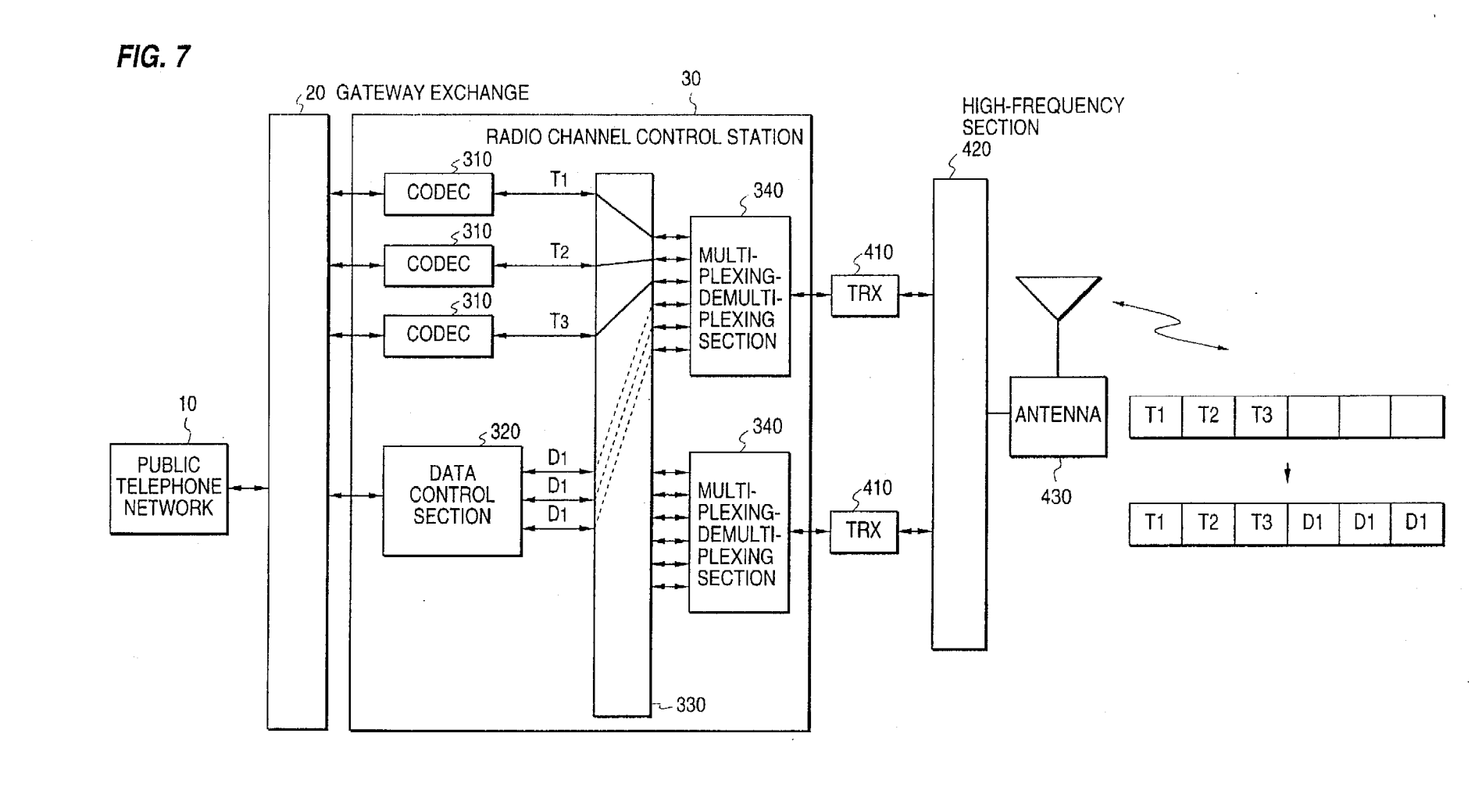
FIG. 7 is a schematic connection diagram in the radio channel control station 30 and the corresponding TDMA frame construction according to the present invention when there are idle time-slots available for allocating to new call request.
Figure 8:
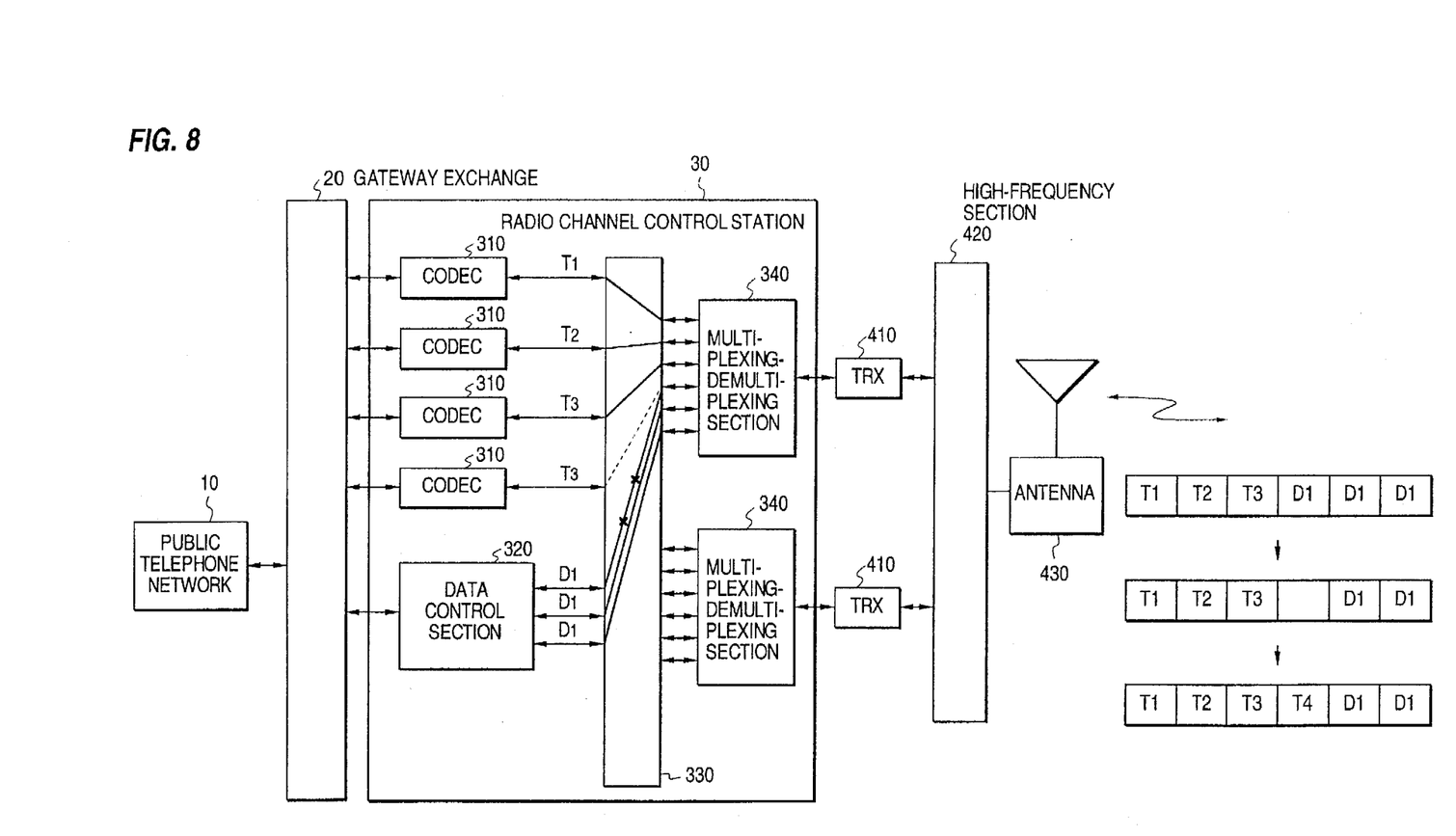
FIG. 8 is a schematic connection diagram in the radio channel control station 30 and the corresponding TDMA frame construction according to the present invention when there is no time-slot available for allocation, and a time-slot being used is allocated to new call request of low transmission speed communication.
Figure 9:
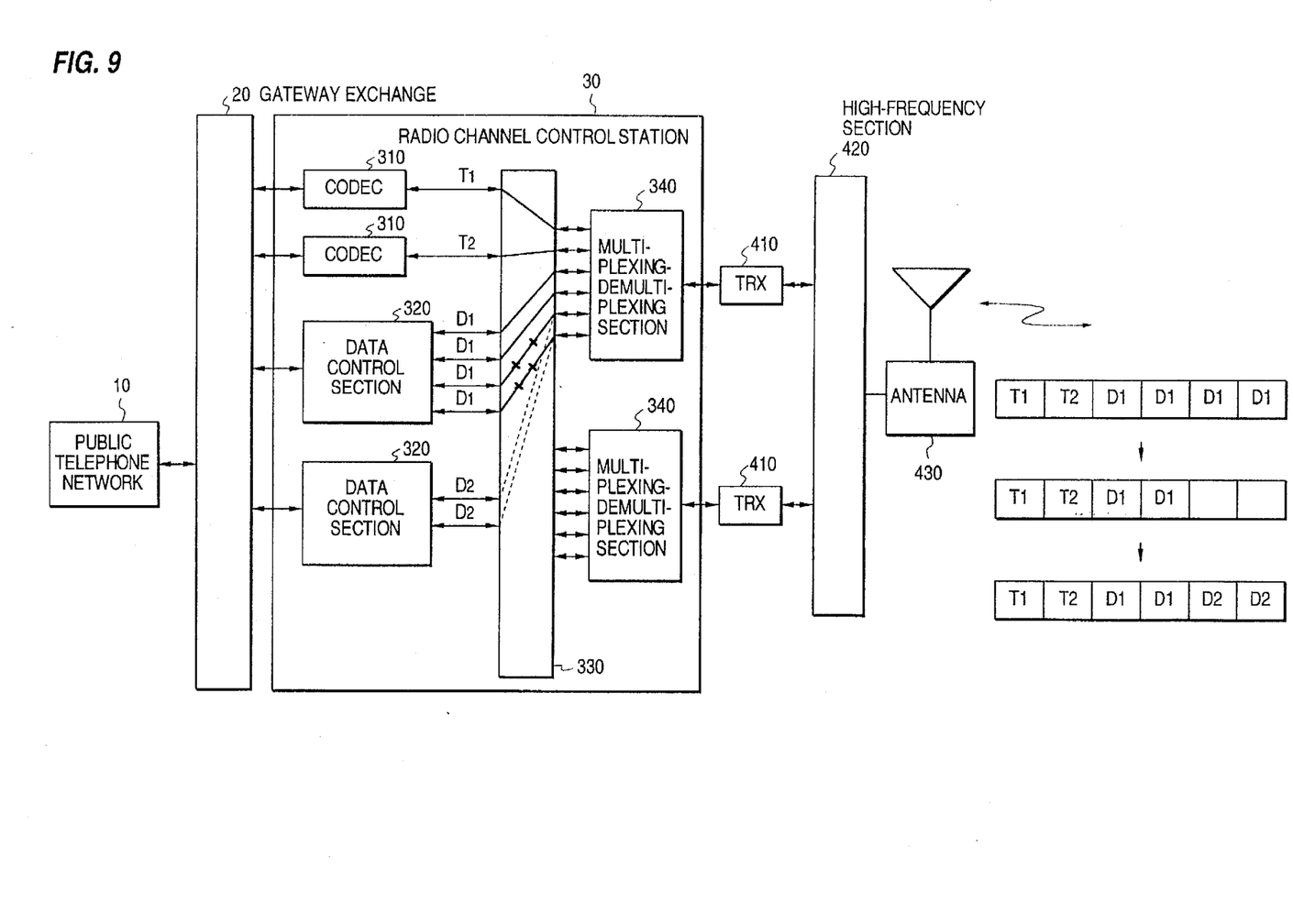
FIG. 9 is a schematic connection diagram in the radio channel control station 30 and the corresponding TDMA frame construction according to the present invention when there is no time-slot available for allocation, and a time-slot being used is allocated to new call request of high transmission speed communication.

FIG. 5 is a flowchart of the time-slot allocation in the radio channel control station 30 at the time when a new call request occurs. FIGS. 7 to 9 are diagrams showing examples of a TDMA frame construction and related connection in the radio channel control station 30.

When a new call is requested, the acquisition of a communication channel will be started (step 500). Initially, it is examined whether the number of idle time-slots required for the communication is available within the cell (step 501). If time-slots are available for the communication, the time-slot allocation is performed (steps 502 and 503).

The TDMA frame construction in this case is shown in FIG. 7. The data D1 for the communication is allocated to three time-slots in the TDMA frame which has only been used by three low transmission speed communication T1, T2 and T3, and other time-slots are currently idle.

When the number of idle time-slots required for the communication is not available, it will be examined whether or not high transmission speed communication using a plurality of time slots exists (step 504). If there is no such a communication using a plurality of time slots, the new call request is rejected and the call becomes a call loss (steps 505 and 506).

When there are a plurality of high transmission speed communications each using a plurality of time slots, high transmission speed communication using a maximum number of time slots is examined among those plurality of high transmission speed communications (steps 505 and 507). Then, whether the new call request is the low transmission speed communication or high transmission speed communication (step 508) is examined.

When the new call request is the low transmission speed communication, one time slot is released from the high transmission speed communication using a maximum number of time slots (steps 509 and 510), and this one time slot is allocated to the new call request (step 511).

The TDMA frame construction and related connection in the radio channel control station 30 in this case is shown in FIG. 8. The low transmission speed communications T1, T2 and T3, and the high transmission speed communication D1 are allocated to time-slots of the TDMA frame. Now, one time slot is released from the high transmission speed communication D1 using three time-slots, and this time slot is allocated to new low transmission speed communication T4. The high transmission speed communication D1 normally requires three time-slots for data transmission, but now, the time-slots available for this communication decreased to two. Therefore, buffering means or other countermeasures are provided in the data control section 320 for adjusting transmission data speed in this condition.

When the new call request is also a high transmission speed communication, a plurality of time-slots are released so that, between the new high transmission speed communication and the high transmission speed communication whose time-slots are to be shared, the time-slots are distributed as evenly as possible (steps 509 and 512). The released time-slots are allocated to the new call request (step 513).

The TDMA frame construction and related connection in the radio channel control station 30 in this case is shown in FIG. 9. The low transmission speed communications T1 and T2 and the high transmission speed communication D1 are allocated to time-slots of the TDMA frame. Now, two time-slots are released from the high transmission speed communication D1 currently using four time-slots, and these two time-slots are allocated to new high transmission speed communication D2. In this example, both of high transmission speed communications D1 and D2 should perform transmission speed adjustment in the radio channel control station 30.

Figure 6:
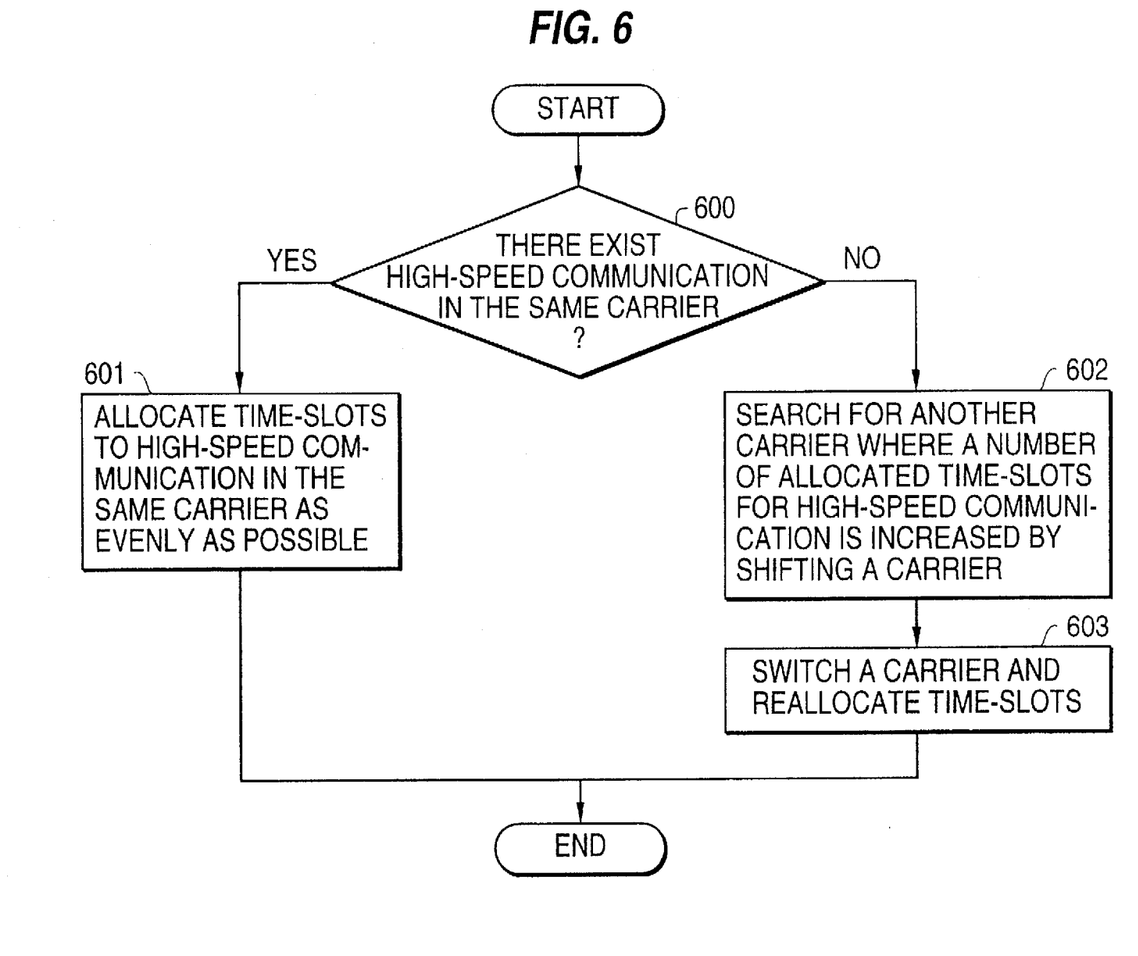
FIG. 6 is a flowchart of the reallocation of idle time-slot according to the present invention.
Figure 10:
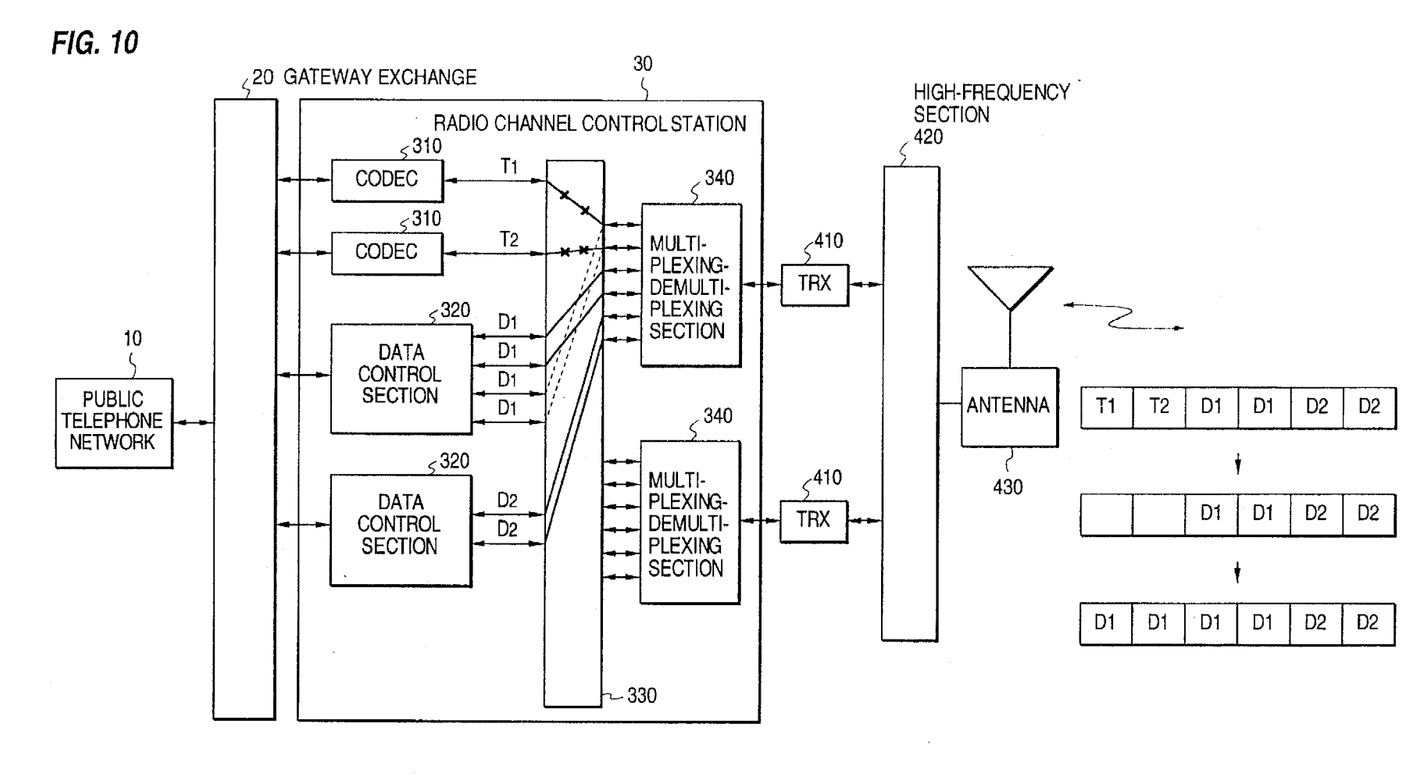
FIG. 10 is a schematic connection diagram in the radio channel control station 30 and the corresponding TDMA frame construction according to the present invention when idle time-slots have become available and signals of high transmission speed communication existing in the same carrier are reallocated to those idle time-slots.
Figure 11:
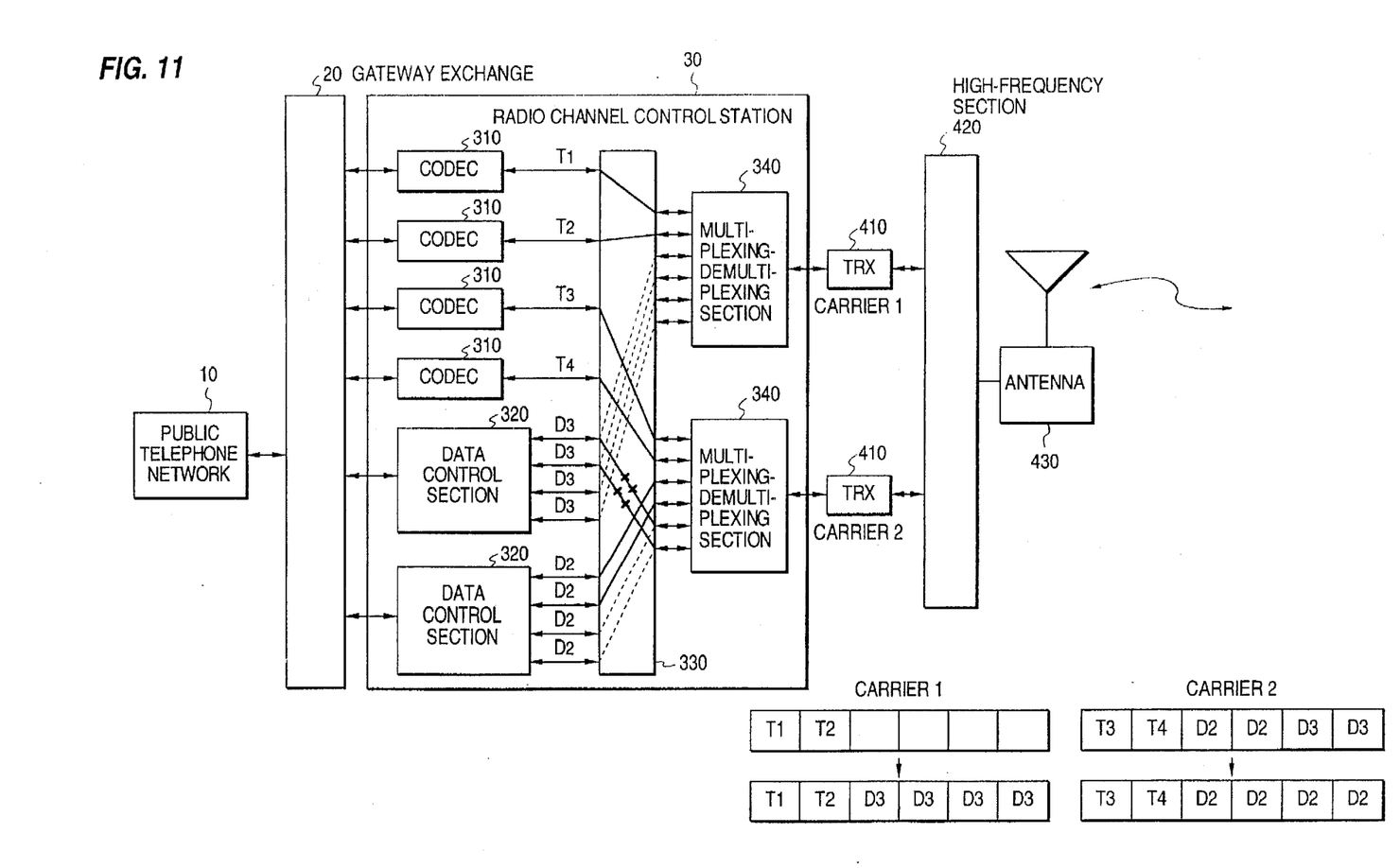
FIG. 11 is a schematic connection diagram in the radio channel control station 30 and the corresponding TDMA frame construction according to the present invention when idle time-slots have become available and signals of high transmission speed communication existing in the different carrier are reallocated to those idle time-slots.

FIG. 6 is a flowchart of the time-slot reallocation when any of idle time-slot becomes available due to completion of other calls. FIGS. 10 and 11 are diagrams showing examples of the time-slot reallocation.

When communication is completed and the time-slot having been used for the communication becomes idle, initially it is examined whether there is a high transmission speed communication that currently does not have a sufficient number of time-slots exists within the same carrier (step 600). If there is such a high transmission speed communication, the time-slots having become idle are reallocated to the communication. If there are more than two such communications, the time-slots having become idle are reallocated to those communications as evenly as possible (step 601). The TDMA frame construction and related connection in the radio channel control station 30 in this case is shown in FIG. 10. The low transmission speed communications T1 and T2 and the high transmission speed communications D1 and D2 are allocated to time-slots of the TDMA frame. Now, the low transmission speed communications T1 and T2 have been completed and two time-slots become idle. These two time-slots are reallocated to the high transmission speed communication D1 which normally requires four time-slots. In this example, the high transmission speed communication D1 has entered a normal state, therefore the transmission speed adjustment (i.e., buffering) having been performed in the radio channel control station 30 is stopped.

When there is no high transmission speed communication in the same carrier, the high transmission speed communication in another carrier is also examined, and the high transmission speed communication in which the number of time slots to be allocated is increased is searched for (step 602). If there is such a high transmission speed communication in another carrier, the high transmission speed communication is switched to the carrier where the idle time-slots become available, and the time-slots are reallocated to the high transmission speed communication (step 603). The TDMA frame construction and related connection in the radio channel control station 30 in this case is shown in FIG. 11. Four time slots have become idle in a carrier 1, however, there is no high transmission speed communication in the carrier 1. When looking at the carrier 2, the number of time-slots is not sufficient for both of high transmission speed communications D2 and D3 and they are sharing time-slots with each other. Therefore, four time-slots being available now in the carrier 1 are reallocated to the high transmission speed communication D3, and as the result of switching the high transmission speed communication D3 to the carrier 1, two time-slots in the carrier 2 have also become available now for the high transmission speed communication D2 to which the number of time-slots were insufficient. In this example, the high transmission speed communication D2 and D3 have entered a normal state, therefore the transmission speed adjustment having been performed for those communications in the radio channel control station 30 is stopped.

As has been described above, the present invention searches for communication using a plurality of time slots, and when there is no idle time-slot available for allocating to a newly requested call, a time-slot is allocated from such a plurality of time slots. Accordingly, there is the advantage that the probability of call loss in this system is reduced.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A method of time-slot allocation for a communication in a time division multiple access (TDMA) communication system which allocates one time-slot for a low transmission speed communication and a plurality of time-slots for a high transmission communication in a TDMA frame, said method comprising the steps of:

detecting a request for a new communication;

examining whether there exist any high transmission speed communications currently communicating in the TDMA communication system, if the number of idle time-slot required for the new communication are not available;

if there exists at least one high transmission speed communication currently communicating in the TDMA communication system, selecting one of the high transmission speed communications, and instructing a mobile terminal involved in the selected high transmission speed communication to suspend communication due to time-slot reallocation;

releasing at least one time-slot from a plurality of time-slots in the selected high transmission speed communication;

notifying the mobile terminal to resume communication with a reduced number of time-slots without using the at least one time-slot; and allocating the at least one released time-slot to the new communication requested.

2. The method of time-slot allocation as set forth in claim 1, wherein the examining step determines whether there exist any of high transmission speed communications in the TDMA system by determining whether any current communications in the TDMA system use a plurality of time-slots in one TDMA frame.

3. The method of time-slot allocation as set forth in claim 1, wherein a number of time-slots to be released is one when said new communication requested is a low transmission speed communication.

4. The method of time-slot allocation as set forth in claim 1, wherein the selected high transmission speed communication is operated with the reduced number of time-slots at a same time that the new communication requested is operated with the at least one related time-slot.

5. The method of time-slot allocation as set forth in claim 1, wherein the number of released time-slots from the selected high transmission speed communication is set as close as possible to a number of time-slots to be allocated for said new communication requested when said new communication requested is a high transmission speed communication.

6. A method of time-slot allocation for a communication in a time-division multiple access (TDMA) communication system which allocates one time-slot for a low transmission speed communication and a plurality of time-slots for a high-speed transmission speed communication in a TDMA frame, said method comprising the steps of:

detecting a request for new communication;

examining whether there are a sufficient number of idle time-slots currently available for the new communication;

selecting one of high transmission speed communication currently communicating in the TDMA communication system with a maximum allowable number of time-slots in one TDMA frame, and instructing a mobile terminal involved in the selected high transmission speed communication to suspend communication due to time-slot reallocation;

releasing at least one time-slot from the maximum allowable number of time-slots in the selected high transmission speed communication;

performing transmission speed adjustment for the selected high transmission speed communication, the adjustment depending on the number of time-slots being released, informing the mobile terminal to resume communication with a reduced number of time-slots for the selected high transmission speed communication, the reduced number of time-slots not including the released time-slots; and allocating at least one released time-slot from the selected high transmission speed communication to the new communication requested.

7. The method of time-slot allocation as set forth in claim 6, wherein a number of time-slots to be released is one when said new communication requested is a low transmission speed communication.

8. The method of time-slot allocation as set forth in claim 6, wherein the selected high transmission speed communication is operated with the reduced number of time-slots at a same time that the new communication requested is operated with the at least one related time-slot.

9. The method of time-slot allocation as set forth in claim 6, wherein the number of released time-slots from the selected high transmission speed communication is set as close as possible to a number of time-slots to be allocated for said new communication requested when said new communication requested is a high transmission speed communication.

10. A method of time-slot allocation for a communication in a time-division multiple access (TDMA) communication system which allocates one time-slot for a low transmission speed communication and a plurality of time-slots for a high-speed transmission speed communication in a TDMA frame, said method comprising the steps of:

detecting any of idle time-slots becoming available due to completion of communication in the TDMA communication system;

finding a high transmission speed communication performing transmission speed adjustment with an insufficient number of time-slots in a carrier with no more idle time-slot available;

finding a different carrier having sufficient idle time-slots becoming available for use of a plurality of time-slots of said high transmission speed communication being found; and reallocating complete time-slots of said high transmission speed communication to the different carrier for allowing the high transmission speed communication to use a sufficient number of time-slots.

* * * * *